(12) United States Patent
Mattaway et al.

(10) Patent No.: US 6,618,040 B1
(45) Date of Patent: Sep. 9, 2003

(54) APPARATUS AND METHOD FOR INDEXING INTO AN ELECTRONIC DOCUMENT TO LOCATE A PAGE OR A GRAPHICAL IMAGE

(75) Inventors: Shane D. Mattaway, Boca Raton, FL (US); Peter B. Reintjes, Boca Raton, FL (US)

(73) Assignee: Targus Communications Corp., Boca Raton, FL (US)

( * ) Notice: Subject to any disclaimer, the term of this patent is extended or adjusted under 35 U.S.C. 154(b) by 0 days.

(21) Appl. No.: 09/662,433

(22) Filed: Sep. 15, 2000

(51) Int. Cl.$^7$ .................................................. G09G 5/00
(52) U.S. Cl. ..................... 345/173; 382/181; 178/18.01
(58) Field of Search .................... 345/173, 174, 345/175, 176, 177, 178, 180, 181, 182, 183, 863, 864; 178/18.01, 18.03, 19.01, 18.1; 382/188, 189, 181, 186

(56) References Cited

U.S. PATENT DOCUMENTS

| | | | |
|---|---|---|---|
| 5,272,470 A | * 12/1993 | Zetts | 345/173 |
| 5,629,499 A | 5/1997 | Flickinger et al. | 178/18 |
| 5,734,882 A | * 3/1998 | Lopresti et al. | 345/179 |
| 6,191,777 B1 | * 2/2001 | Yasuhara et al. | 345/173 |
| 6,373,473 B1 | * 4/2002 | Sakaguchi et al. | 345/173 |

* cited by examiner

*Primary Examiner*—Xiao Wu
(74) *Attorney, Agent, or Firm*—Fleit, Kain, Gibbons, Gutman & Bongini P.L.

(57) ABSTRACT

A pen-based tablet computer system that locates objects in a collection of stored images by using partial tracing of a graphical data object. The system uses data generated from the partial tracing of the graphical object to control a search of the input data file for the most likely graphical object which is a match. When the most likely match is located, the input data page containing the matched image is determined. The system then may determine the page of form data that applies to the input data page that contains the graphical object and the correct input data page and form data page are simultaneously displayed on the computer display screen. The graphical object may be an image, text data, a line drawing, etc.

18 Claims, 3 Drawing Sheets

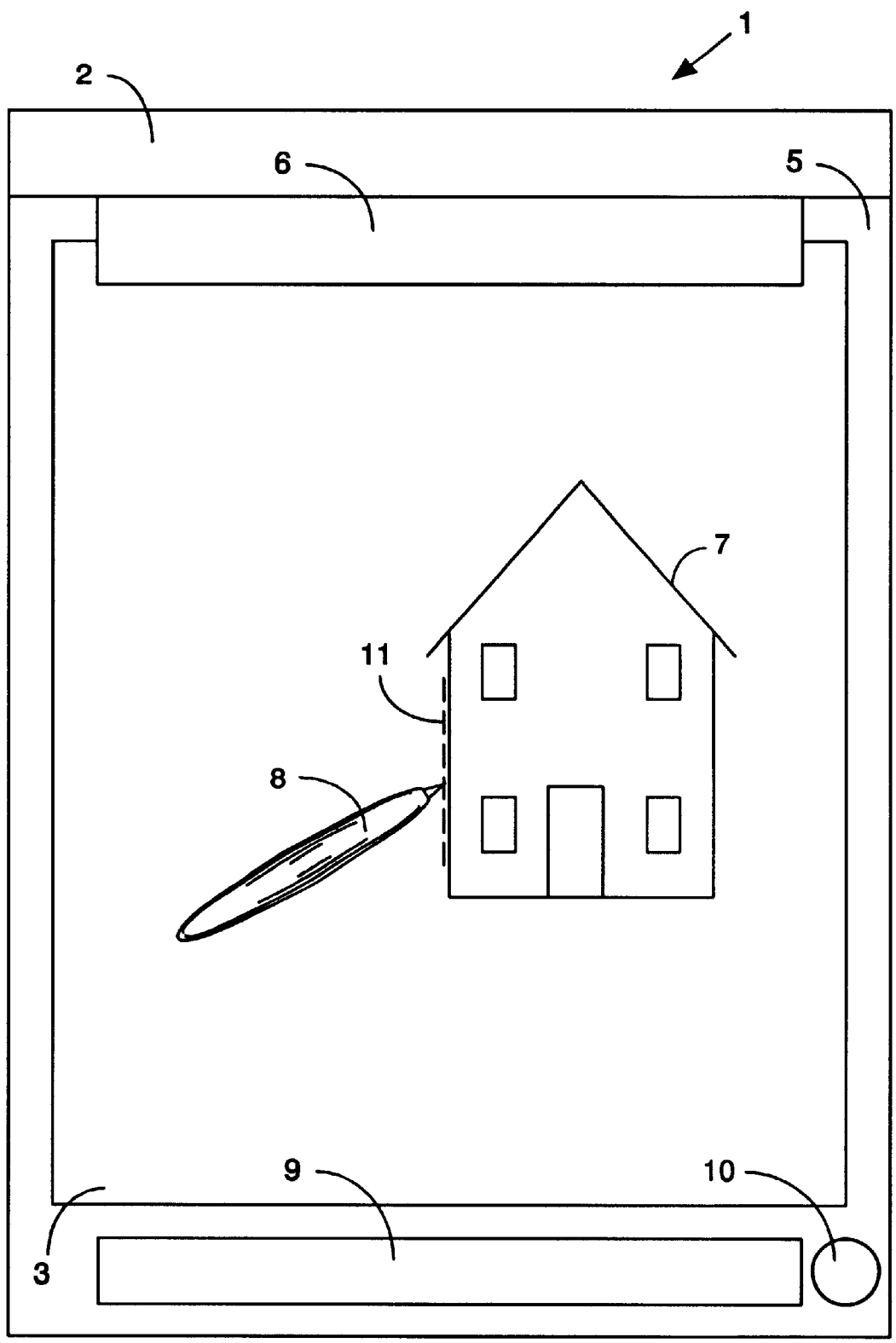

Figure 3

| | |
|---|---|
| 100 | Get TRACEPOINTS (e.g. 100) data points from user input |
| 101 | Select SAMPLE (e.g. 10) of these points at random |
| 102 | Set Best-Page-Figure-of-Merit = 1,000,000; |
| 103 | For ( each page in search set) |
| 104 |    For ( each point on the page ) |
| 105 |       For ( each sample point in the trace pattern ) |
| 106 |          If ( X-distance < PROXIMITY ) |
| 107 |            If ( Y-distance < PROXIMITY ) |
| 108 |               If (Euclidean-distance < NEARBY ) |
| 109 |                  Increment density for this sample point; |
| 110 |                  If (this point closer than previous closest) |
| 111 |                     Save this as closest distance; |
| 112 |       End for each point in the trace pattern |
| 113 |    End for each point on the page |
| 114 | Figure-of-Merit = 0; |
| 115 | For ( each sample point ) |
| 116 |    Figure-of-Merit = Figure-of-Merit<br>              + closest distance for this sample<br>              + density for this sample |
| 117 | If ( Figure-of-Merit < Best-Page-Figure-of-Merit ) |
| 118 |    BestPage = this-page; |
| 119 |    Best-Page-Figure-of-Merit = Figure-of-Merit; |
| 120 | End for each page in search set |

APPARATUS AND METHOD FOR INDEXING INTO AN ELECTRONIC DOCUMENT TO LOCATE A PAGE OR A GRAPHICAL IMAGE

BACKGROUND OF THE INVENTION

1. Technical Field

The present invention relates to pen-based computer systems. In particular, it relates to a method and apparatus for locating an electronic image within a data file by tracing over a portion of a graphical object (which may be text, line data, image data, etc), and electronically converting the pen strokes to search argument data which is used to search the data file. Once the graphical object is located, the page it is stored in is identified, and the electronic image of the page containing the graphical object is displayed on the computer's display screen.

2. Background Art

The development of compact high-performance computers has resulted in many new applications which heretofore were not feasible due to their demand on system resources. One such application is the pen-based, or tablet, computer. Pen-based computer applications are particularly useful in mobile environments, especially where form data is used. For example, businesses such as delivery services which previously used paper forms can now use a pen-based tablet computer to display an image of a form which the user fills out electronically. In this type of application, the system would normally keep a copy of the form image separate from the data input by the user. This allows the input data to be more conveniently stored and/or transmitted.

Once electronic forms were developed, the next step was the development of multiple-form electronic documents. This type of document may, for example, be a patient questionnaire used by physicians to obtain basic health data from a patient. However, as the size of a multiple page document increases, locating the page within the document that contains a particular item becomes more difficult. A disadvantage associated with multiple page documents is caused by the separation of the form data from the input data, as discussed above. It would be desirable to have a method of identifying an item of input data and then automatically identifying the associated page of form data so that they could be simultaneously displayed on the computer's display screen.

While addressing the basic desirability of using electronic, rather than paper forms, the prior art has failed to provide a multi-page electronic forms system which is capable of identifying an item of input data that was previously entered, identifying the electronic image which it is associated with, and accessing that electronic image.

SUMMARY OF THE INVENTION

The present invention solves the foregoing problems by providing a system that allows an individual who is entering multi-page data into a pen-based system to quickly locate the electronic image of an entered page by tracing over a portion of a graphical object. The system uses the trace data to locate the page containing the graphical object which most closely matches the traced points. Once the electronic image of the input data page is identified, the electronic image can then be viewed or modified. For the convenience of the user, the system can also determine which page of form data applies to the identified page. The correct input data page and form data page are then simultaneously displayed on the computer display screen. The system identifies a graphical object, such as an image, text data, a line drawing, etc, by allowing the user to trace a partial outline of a graphical data item. The trace data is then used to control a search of the input data file for the most likely graphical object which is a match. The page that the graphical object is located on is then displayed along with the corresponding form page.

BRIEF DESCRIPTION OF THE DRAWINGS

FIG. 2 is a top view of a preferred embodiment of the invention which illustrates a pen input device tracing over a pre-existing graphic figure to generate input data for trace searching.

FIG. 3 illustrates a preferred embodiment of the software program steps that can be used to implement the trace searching function.

DESCRIPTION OF THE PREFERRED EMBODIMENT

Figure 1:
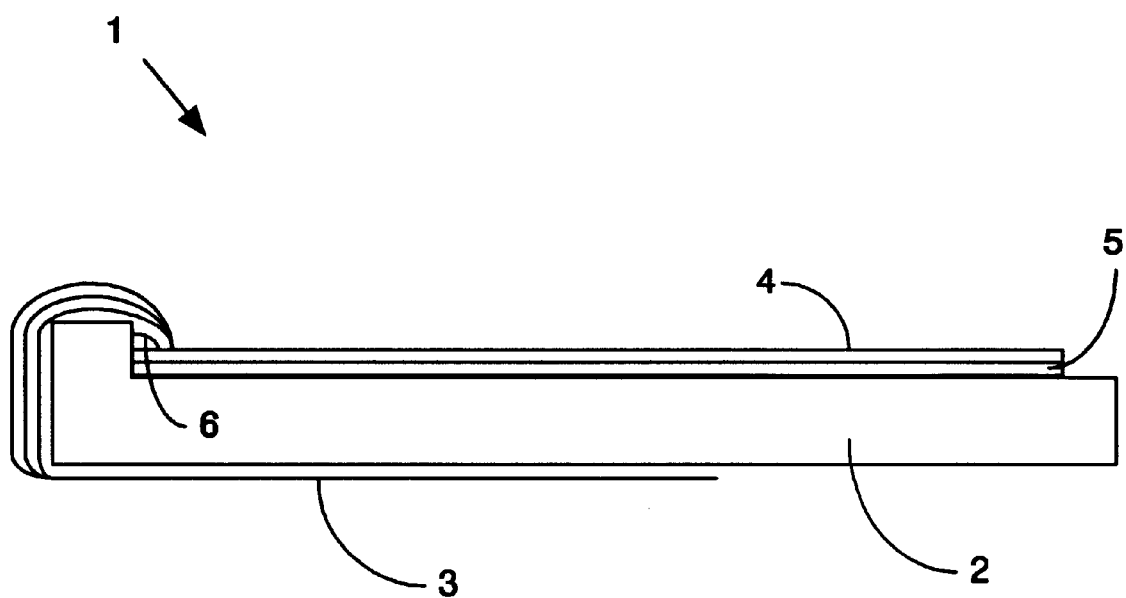
FIG. 1 is a side edge view of a prior art tablet computer which illustrates the computer that holds a multi-page form.

Prior to a discussion of the figures, a general overview of the features and advantages of the invention will be presented. The principal embodiment of this invention is used in conjunction with an electronic clipboard consisting of a pad of paper on top of a digitizing tablet. This configuration allows a user to draw images directly on paper while simultaneously capturing the information electronically. The preferred embodiment of the invention is a pen-based computer system which allows a user to identify and select a graphical object which was previously entered on a page of a multi-page document. The user traces over a portion of the graphical object with a pen data entry device. The graphical object can be a drawing, a text field, a portion of a form, etc. The system inputs the traced data to a search engine which searches the previously entered pages of the multi-page document until the most likely match is found. The use of trace data to locate stored electronic images is referred to herein as a Trace-Find operation.

This feature is especially useful for a user who wishes to refer to a previous page, either to add or erase images. The user accesses the electronic image of the desired page by flipping back through the paper pages until the desired paper page is on top of the clipboard and then traces over a small part of the drawing on that page. The system can then identify which page the user has on top of the clipboard by using the trace data as a search argument to locate the electronic image corresponding to that page. When the trace data matches data stored on the system, that electronic image is selected and displayed for the user. Subsequent drawing on that page can then be added to the associated electronic image.

This method can also be used to identify pre-printed forms when they are placed on top of the electronic clipboard. The user selects a form, aligns it on the clipboard and then traces over the form title, a form id number, or an identifying logo located on the form. This method can be used with any distinguishing feature since it does not depend upon recognizing text or pictures as such, but simply looks to find the minimum differences between tracing the graphical images on the candidate pages or forms. Because the registration of the form on the tablet is not exact, this technique will require the algorithm to compensate for small offsets between the tracing and the stored images.

This method provides a significant advantage to a user, because it allows the user to quickly access a selected page of a multi-page form in electronic storage without having to manually scroll through many pages. In addition, even if the user is using a single page form, when the user wants to fill out the form, the user must somehow select the electronic image of the form which is stored on the system. Prior to the invention, the user would have to step through a menu to obtain a copy of that electronic form, or use some other awkward or slow procedure. The invention allows the user to place the form on the electronic clipboard, to trace a portion of a graphical object on the form, and to then use the invention's search engine to locate the correct form.

Those skilled in the art will recognize that this search technique, while particularly useful for pen-based computer systems, can also be used to search a variety of databases for graphical objects. As a result, it can be very useful for searching graphic databases which do not easily lend themselves to keyword searches.

For ease of discussion, the following definition of terms shall be used throughout the specification: a) "Book" shall be used to indicate a logical collection of supported objects. For example, note pages, audio recordings, forms or images. For the purpose of this discussion, books may contain textual and/or graphical images; b) "Page" shall be used to indicate a single graphical image or a set of pen strokes collected from a data tablet or other computer pen-input device that the user intends to keep together and display as a unit. A page may correspond to any hardcopy paper, such as a drawing, a single sheet of an engineering blueprint, or a sketch on a cocktail napkin. A book contains one or more pages; c) "Trace" shall be used to indicate a small set of pen strokes corresponding to a few short lines entered by the user to identify a page. In fact, it is possible for a trace to be a single line. It will be assumed that the user enters this data by tracing over a hardcopy of an existing drawing; and d) "Figure-of-Merit" shall be used to indicate a numerical value representing the closeness of a match between a trace and a graphical object. For the present discussion, the smallest value for the Figure-of-Merit corresponds to the best match.

To effectively use this technique, the system must operate with a high degree of accuracy due to the inherent limitations of pen-based computer systems. In particular, portable note-taking devices often do not have high-resolution displays. Whereas a desktop PC can take advantage of high-resolution displays to provide feedback on the images in a book, or to allow the user to select between candidate matches, the lower resolution displays used by many clipboard applications may require feedback in the form of audio output to indicate a good (or poor) match to the user. Likewise, high accuracy means that the user will select the correct page with a single trace interaction. Especially in the situation where no visual feedback is provided, confidence must be high that the proper page has been selected.

Performance is also a factor for pen-based computers which may often be lacking in processing power. An advantage of the invention is that it is capable of executing effectively on systems with relatively low processing power, such as a RISC processor with a clock speed well under 100 Mhz.

The invention can also be implemented as a scalable process to accommodate large books. While it is expected that the vast majority of search activity would be made on smaller books, the examination of up to a few hundred pages may be required for a given search, with pages containing as much as 10,000 points. For extremely large books or pages with unusually dense drawings, it is preferable to perform a two-level search that can eliminate a large number of pages quickly, and then run a more precise version of the search on the remaining candidate pages.

The steps taken by the system to perform a basic search are as follows. The system requires the user to select a book to be searched for the trace pattern. For ease of discussion, the present description assumes a single book has been selected. However, those skilled in the art will recognize that the trace searching can be applied to a collection of books.

The system uses a small number of points (the trace points) which are input from the user's data tablet as the user traces a graphical object. Preferably, the system collects only points that occur while there is pressure on the pen nib. This allows the user to trace several places on the drawing by lifting and moving the pen. The preferred embodiment collects 100 points, which corresponds to about one second of interaction or about two inches of linear drawing. A small number (5 to 10) of these trace points are then taken at random from the collection of 100 trace points. This is really a pseudo-random subset of the complete set of trace points and for efficiency we simply use a set of indexes (e.g. 3,5,13,22,45,48,52,63,85,92) to extract 10 points from the set of 100. Because the user is tracing over an existing drawing that we know to be in the set of pages to be searched, all of these points must be near corresponding points on the page in question.

For each page, all points on that page are compared with this set of ten sample points and we find the distance between each sample point and the nearest point on the page. These ten distances (each sample point and its nearest page point) are added together along with a density measure (one for each other point on the page that is within a specified proximity distance to the sample point) to form a value called the Figure-of-Merit. If the Figure-of-Merit is low, this means that the sample points were relatively close to points on the page and also that the density of the drawing in those regions was relatively low. The page with the lowest Figure-of-Merit should contain the drawing the user has traced.

One factor that can affect the Figure-of-Merit is its density component. For example, consider a first page with a completely filled-in box and a second page with a single line describing a circle. If the user traces the circle, it may be possible that every one of the sample points is exactly over some point in the densely filled in box (yielding a sum of distances of zero), while a comparison with the actual drawing of the circle being traced yields distances in the 10–50 pixel range because of the error involved in tracing over the drawing. In this situation, it is the density of the filled-in box that can tell us that it is not a good match for the circle. Therefore, the more likely candidate will be the page with the lowest density. To identify the page with the box, the user should trace along the edge of the box to halve the density contribution and thereby make it a better candidate. Due to the use of the density component, the algorithm works very well with line drawings. For example, to identify a page with a line drawn between two filled-in boxes, it would be better to trace the line rather than the edges of the boxes.

In the preferred embodiment, the following set of parameters are used. However, those skilled in the art will recognize that the parameters used in the preferred embodiment do not critically depend upon the number of initial trace points gathered from the user or the size of the trace point samples. These variables may be changed, and some changes may be preferable for a particular type of application.

The first step in the process is to define the total number of trace points, and then to define the number of sample points to be selected from those trace points. In the preferred embodiment, there are 100 trace points, and 10 sample points. Using a small number of sample points, such as 5, increases the error rate unacceptably, while a slightly larger number of sample points, such as 10, provides a much lower error rate. However, since the sample points must be compared against every point on every page of the search set, it is desirable to keep the number of sample points as small as possible. Likewise, while using 100 trace points works well without user feedback, this value can be reduced. Optionally, more points can be requested if the system needs to distinguish between several pages which give a partial match to the smaller initial trace pattern. Those skilled in the art will recognize that the number of trace points and sample points is not critical, and in practice will be a design choice made by the user with consideration given to factors such as available processing power, etc.

In addition to the number of trace points and the number of sample points, there are a number of other parameters that depend upon the resolution of the input data, the size of the books to be searched, and the accuracy and speed produced by the parameters. Those skilled in the art will recognize that while these values may be compiled into the application (as they are in the preferred embodiment), they could easily be implemented as variables and modified under program control.

In addition to the total number of trace points, and the number of sample points, several other parameters are used to implement the invention. The set of parameters used in the present embodiment and their meanings are as follows.

The "PROXIMITY" parameter is used to eliminate points which do not have to be considered. In the preferred embodiment, the PROXIMITY parameter is set to 100. Any points with a single coordinate farther away than this value are not considered in any detailed calculations. Using this value, the algorithm can avoid two multiplications and a square root computation for every pair of points that are farther apart than PROXIMITY in at least one coordinate.

The "NEARBY" parameter is used to determine distance from a sample point in both coordinates. In the preferred embodiment, the nearby parameter is set to 141. This is set as the square root of twice the square of the PROXIMITY parameter. It describes the circle of points that are within proximity in both coordinates. Only points with Euclidean distance closer than this are considered as possible trace match points. NEARBY can be made smaller than this circle since it is the final measure that contributes to the Figure-of-Merit calculation for a match, while the PROXIMITY parameter merely eliminates candidates from the initial search.

The "BAD MATCH" parameter is set to 500,000. Pages that generate a Figure-of-Merit smaller than this number are considered to be possible matching pages. If none of the points on a page are within proximity of any point in the trace sample, the total Figure-of-Merit will be set to 1,000,000, or twice the preferred value of Bad Match. Currently, the Bad-Match value is used to indicate that the user wants to leave the Trace-Find mode, since the pattern traced by the user does not generate a reasonable Figure-of-Merit for any of the pages in the search set. That is, if the user scribbles randomly on a page while in Trace-Find mode, the method will very likely generate a Figure-of-Merit which is greater than 500,000.

Once the system has searched for a page, using the trace information, feedback is provided to the user regarding the success of the operation. User feedback is of particular importance in applications where the principal medium is paper. In these environments, computer displays may be small or non-existent but the user still needs immediate feedback on graphical operations. For example, there are three conditions that arise as a result of a search based on trace data. The first condition is "Task Completed." When the data entered was sufficient to identify a page with high accuracy, the user is informed that the page has been identified and can now being modified via additions or deletions. The second condition is "Continue Tracing." When the data entered matches more than one page, this feedback tells the user to continue tracing until the most likely page is identified. Finally, the third condition is "Exiting Trace Mode." This condition indicates that the trace data does not remotely resemble any image in any page data in the system and this feedback informs the user that the page search has terminated.

In the preferred embodiment, an audible "ping" sound is generated to indicate that the search was successful, a soft buzzing noise is used to indicate that more data is required, and a "whoosh" sound is produced to indicate that the search is being terminated.

The following discussion describes how the preferred embodiment uses trace searching to locate various objects on a page. In the previous discussion, a description was provided to illustrate how trace searching is used to locate a particular page in a book by identifying part of an object drawn on that page. However, if a page has been separated into objects (e.g. for editing operations), then trace searching can be used for object selection by identifying sub-parts of a page as well as the page itself. If tracing a few lines could identify an object consisting of a collection of lines which do not connect with other lines on the page, the entire sub-image of a drawing could be marked and associated with a particular operation, such as playing an associated audio annotation.

Trace searching can also be used to locate raster images in a database. For example, if photographic or other raster images are in a book, it is possible to create searchable images by extracting a black-and-white outline image from the raster data by following equal-color contours. The trace searching process can use these black and white outline images to locate a specific photographic image from an outline trace. Of course, the trace searching process requires the user to have a properly scaled and aligned copy of the image on the clipboard or other data entry device in order to match the computed outline image.

In addition to using the Trace-Find operation to identify what would conventionally be considered graphical objects (e.g. drawings, photos, etc.), the Trace-Find operation can also be used to locate text in the same manner. In the case of text data, the user traces over the letters in the text and the Trace-Find operation would treat the text data in the same manner as it treats other types of graphical objects.

The system can also be used to locate an audio recording and to offset into that audio recording. In the case where the tablet computer is used as a note-taking device, it may be capturing voice dictation as it captures the drawings. Since the Trace-Find operation is not merely locating a page, but the specific lines matching the trace input, it is possible to identify the audio recording closest in time to the drawn segment, as well as the time offset into that audio recording that is closest to the timestamp of the traced line. In the preferred embodiment, the audio playback point will begin at the point corresponding to the timestamp of the line containing the matching points in the most recent audio recording whose begin time is before the timestamp of the drawn segment. Those skilled in the art will recognize that, as a practical matter, the beginning of the audio playback may be started a few seconds before the actual point located by the traced lines to ensure that the desired audio data is heard.

Referring to FIG. 1, this figure shows a side edge view of a prior art pen-based computer 1 holding a multi-page form 3–4. The tablet computer 2 has a digitizing grid device 5 on its upper surface. A multi-page form 3–4 is shown which is secured to the pen-based computer 1 via clip 6. Those skilled in the art will recognize that the clip 6 can be anything capable securing a paper form to the pen-based computer, and may in fact be eliminated altogether if the form is held in position by the user. The preferred embodiment, described below, does not require the clip 6, but it is illustrated as an optional device. In this view, several pages of the multi-page form 3 have been filled out and folded over the end of tablet computer 2. The unused page of the multi-page form 4 lies on top of the digitizing grid device 5. When the user fills out the unused page of multi-page form 4, then the user's pen strokes are detected by the digitizing grid device 5 and electronically stored in the pen-based computer 1.

In FIG. 2, a preferred embodiment of the pen-based computer 1 is shown. The tablet computer 2 is shown securing, via optional clip 6, the filled in pages of multi-page form 3 to the digitizing grid device 5. Pre-existing graphical image 7 is being traced by pen device 8. Dashed line 11 indicates the trace path of the pen device 8. As can be seen from this illustration, the actual trace path will not typically perfectly overlap the graphical image 7. As the graphical image 7 is traced, digitizing grid device 5 detects of the pen device 8 and generates an electronic representation of those movements. Digitizing grid devices 5 and their associated pen devices 8 are well-known in the art. The system, using the trace point and sample point generation technique discussed above, produces the sample points needed to conduct a search.

At the conclusion of the search, the system will generate either a task completed, continue tracing, or exiting trace mode condition. The system will indicate the status of the search via any suitable means. For example, speaker 10 can be used to generate audio signals as discussed above. Likewise, an optional display 9 can be used to output the status messages such as the page number of the selected page and a thumbnail sketch of the data on that page.

In FIG. 3, an example of the programming steps needed to implement the invention is provided.

At step 100 trace points input by the user are collected by the system. Once the trace points are obtained, a subset (e.g. 10) of these points are selected at random in step 101. To determine which is the most likely page, at step 102 a Best-Page-Figure-of-Merit value is set to 1,000,000 for (each page in the search set). The lowest Best-Page-Figure-of-Merit value will indicate the most likely page match at the end of the search.

At step 103 an examination of each page in the search set is begun. The system examines each point on the page at step 104. For each point on the page, the system calculates at steps 105 through 111 the distance between that point and the sample point. This is repeated until all sample points on a page have been examined. For each sample point, a Figure-of-Merit value is determined based on the proximity of sample points to points on a pre-existing page.

Each page will then have a Figure-of-Merit assigned, at steps 114–116, which indicates the likelihood that it is the best match. At steps 117–119, a Best Page (e.g. most likely match) value is determined by taking the lowest Figure-of-Merit as the pages are examined. At the end of the search, the best page value will indicate the most likely match.

Those skilled in the art will recognize that the steps in FIG. 3 can be modified, and the values changed, as long as the principles embodied in the steps of this figure are observed. For example, the number of sample points can be changed, the value used to determine proximity can be changed, etc.

While the invention has been described with respect to a preferred embodiment thereof, it will be understood by those skilled in the art that various changes in detail may be made therein without departing from the spirit, scope, and teaching of the invention. For example, the software platform may be anything suitable for pen-based computers, the software used to implement the Trace-Find operation may vary, the type of output device used to indicate status can vary, etc. Accordingly, the invention herein disclosed is to be limited only as specified in the following claims.

We claim:

1. A method of locating the electronic page image in which data was previously stored, including the steps of:
   placing a copy of a previously drawn image on a pen digitizing device attached to a computer;
   tracing over a portion of the previously drawn image to produce trace data;
   comparing the trace data with the electronic page images previously stored in a computer; and
   selecting the electronic page image which most closely matches the trace data;
   whereby the electronic page images can be retrieved by matching trace data with the electronic page images.

2. A method, as in claim 1, including the additional step of:
   using a graphic image as the previously drawn image; and
   generating the trace data by tracing over the edges of the graphical image.

3. A method, as in claim 1, including the additional step of:
   using a multi-color graphical image as the previously drawn image; and
   generating the trace data by tracing over the color edges of the multi-color graphical image.

4. A method, as in claim 1, including the additional step of:
   using text data as the previously drawn image; and
   generating the trace data by tracing letters in a text field.

5. A method, as in claim 1, including the additional step of:
   using a preprinted form as the previously drawn image; and
   generating the trace data by tracing portions of the preprinted form.

6. A method, as in claim 1, including the additional steps of:
   selecting a predetermined number of trace points from the trace data;
   comparing the selected trace points to data points in electronic page image stored in the computer; and
   selecting electronic page images based on the closest proximity of the trace points to the data points in the electronic page image;
   whereby electronic page images that most closely match the trace data are selected.

7. A method, as in claim 6, including the additional steps of:
   selecting a predetermined number of sample points from the selected trace points;
   comparing the sample points with the data points in the electronic page images stored in the computer;
   setting a figure-of-merit value for each electronic page image based on the proximity of the sample points with the data points in the electronic page image; and
   identifying at least one candidate page by determining the electronic page image with the lowest figure-of-merit value;
   whereby the time taken for the search comparison of the data points to the trace data is reduced by using the sample points and the most likely electronic page image is identified.

8. A method, as in claim 7, including the additional steps of:
   selecting, when more than one candidate page is selected, a different set of sample of points from the trace points and comparing the sample points with the data points in each selected candidate page; and
   selecting the candidate page which is the most likely match with the different set of sample points;
   whereby similar pages can be distinguished by iteratively searching the data stored on the computer with different sets of sample points.

9. A method, as in claim 1, the the additional steps of:
   selecting a predetermined number of sample points from the trace data;
   comparing the sample points with the data points in the electronic page images stored in the computer;
   setting a figure-of-merit value for each electronic page image based on the proximity of the sample points with the data points in the electronic page image; and
   identifying at least one candidate page by determining the electronic page image with the lowest figure-of-merit value;
   whereby the time taken for the search comparison of the data points to the trace data is reduced by using the sample points and the most likely electronic page image is identified.

10. A method, as in claim 9, including the additional steps of:
    selecting, when more than one candidate page is selected, a different set of sample of points from the trace points and comparing the sample points with the data points in each selected candidate page; and
    selecting the candidate page which is the most likely match with the different set of sample points;
    whereby similar pages can be distinguished by iteratively searching the data stored on the computer with different sets of sample points.

11. A method, as in claim 9, including the additional steps of:
    determining a figure-of-merit for each candidate page by:
      determining the distance between each sample point and the nearest point on the page by comparing all points on the electronic page image with the sample points;
      adding the distances between each sample point and its nearest page point to form a figure-of merit value; and
    selecting the candidate page which has the lowest figure-of-merit;
    whereby the candidate page with the lowest figure-of-merit is selected as the most likely match.

12. A method, as in claim 1, including the additional steps of:
    creating audio recordings in conjunction with graphical objects for storage as electronic audio recordings;
    storing time data related to the graphical objects and the electronic audio recordings which indicate their respective times of creation; and
    locating previously stored audio recordings which were stored in conjunction with graphical objects by:
      identifying a graphical object which was created at the approximate time the audio recording was created;
      tracing over a portion of the graphical object to create trace data;
      using the trace data to locate an associated electronic data image;
      obtaining the storage time data related to the graphical object;
      selecting electronic audio recordings with storage time data within a specified time range of the storage time data graphical object; and
      Outputting the selected electronic audio recordings to an audio output device;
    whereby stored electronic audio can be located by tracing graphical objects which were created at approximately the same time range.

13. A method of locating an image in a graphical object database in which data was previously stored, including the steps of:
    placing a copy of a previously drawn graphical object on a pen digitizing device attached to a computer;
    tracing over a portion of the previously drawn graphical object to produce trace data;
    comparing the trace data with graphical objects in a graphical object database stored in a computer; and
    selecting the graphical object which most closely matches the trace data;
    whereby a graphical object database can be searched by matching trace data with graphical objects in the database.

14. A method, as in claim 13, including the additional steps of:
    selecting a predetermined number of trace points from the trace data;
    comparing the selected trace points to data points in the electronic page images; and
    selecting electronic page images based on the closest proximity of the trace points to the data points in the electronic page images;
    whereby electronic page images that most closely match the trace data are selected.

15. A method, as in claim 14, the the additional steps of:
    selecting a predetermined number of sample points from the selected trace points;
    comparing the sample points with data points in the electronic page images stored in the computer;
    setting a figure-of-merit value for each electronic page image based on the proximity of the sample points with the data points in the electronic page image; and
    identifying at least one candidate page by determining the electronic page image with the lowest figure-of-merit value;
    whereby the time taken for the search comparison of the data points to the trace data is reduced by using the sample points and the most likely electronic page image is identified.

16. A method, as in claim 15, including the additional steps of:

selecting, when more than one candidate page is selected, a different set of sample points from the trace points and comparing the sample points with the data points in each selected candidate page; and selecting the candidate page which is the most likely match with the different set of sample points;

whereby similar pages can be distinguished by iteratively searching the data stored on the computer with different sets of sample points.

17. A method, as in claim 15, including the additional steps of:

determining, when more than one candidate page is selected, the candidate page with the lowest data density in the vicinity of the sample points; and selecting the candidate page which has the lowest data density in the vicinity of the sample points;

whereby the candidate page with the lowest density value in the vicinity of the sample points is selected has the most likely match.

18. A method, as in claim 13, including the additional steps of:

creating audio recordings in conjunction with graphical objects for storage as electronic audio recordings;

storing time data related to the graphical objects and the electronic audio recordings which indicate their respective times of creation; and locating previously stored audio recordings which were stored in conjunction with graphical objects by:

identifying a graphical object which was created at the approximate time the audio recording was created;

tracing over a portion of the graphical object to create trace data;

using the trace data to locate an associated electronic data image;

obtaining the storage time data related to the graphical object;

selecting electronic audio recordings with storage time data within a specified time range of the storage time data graphical object; and outputting the selected electronic audio recordings to an audio output device;

whereby stored electronic audio can be located by tracing graphical objects which were created at approximately the same time range.

* * * * *